Aug. 18, 1970 R. L. SEARING 3,524,245
CONTINUOUS TUBE FORMING AND METALLIZING PROCESS
Filed April 11, 1968
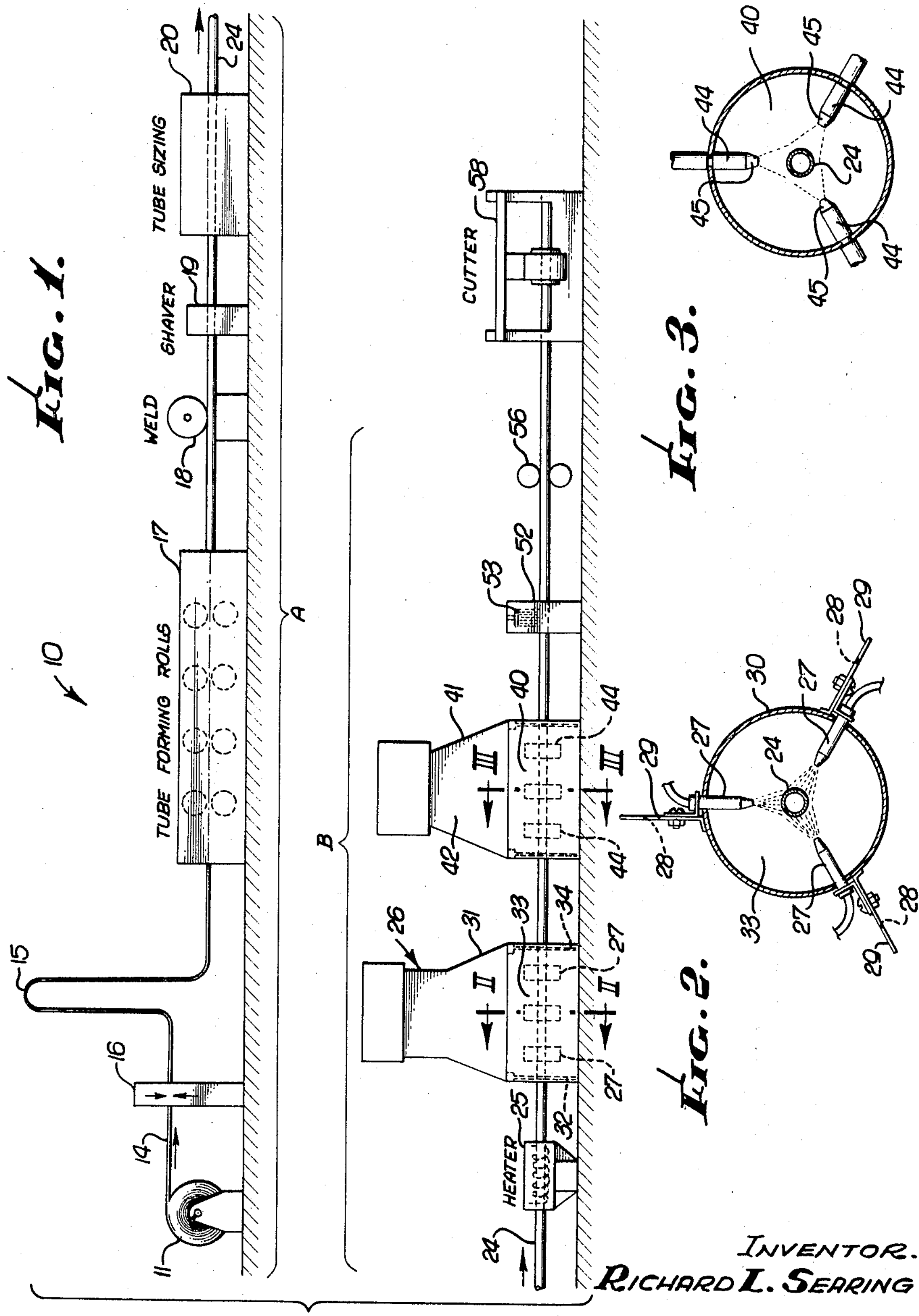
INVENTOR.
RICHARD L. SEARING
Miketta, Glenny, Poms & Smith
ATTORNEYS.

3,524,245
CONTINUOUS TUBE FORMING AND METALLIZING PROCESS

Richard L. Searing, Pomona, Calif., assignor to MSL Tubing and Steel Company, Los Angeles, Calif., a corporation of California Filed Apr. 11, 1968, Ser. No. 720,654
Int. Cl. B23p *19/00, 3/02;* B23k *11/00*
U.S. Cl. 29—430 6 Claims

ABSTRACT OF THE DISCLOSURE

A metal tube which has been formed from a flat non-coated metal strip and has been continuously seam welded and sized to selected diameter is reheated to a selected temperature, subjected to shot blasting while in the heated state, and a metallizing coating is then sprayed on the heated tube so that the coating is bonded and adhered to the surface of the metal tube, the coated tube is cooled and then cut to selected length, all of the steps being performed while the tube is continuously advanced at a selected rate of speed up to and in the order of a hundred feet per minute.

BACKGROUND OF THE INVENTION

Metal tubing formed from a flat strip of metal, which is passed through tube-forming rolls to bring side edges of the strip into closely adjacent relation and then welding the edges to form a longitudinally extending seam, is well known in the art. Often the longitudinal weld is scraped or scarfed to provide a smooth continuous cylindrical surface on the tube. When it has been desired to coat the cylindrical surface of the tube for protection against corrosion the tube has been galvanized. One prior proposed method of galvanizing such a tubing has included passing a formed tube through several cleaning, washing and pickling tanks in order to remove any scale or foreign matter which might prevent proper adherence of the galvanized coating to the tube surface. After the tube surface has been cleaned the tube has been heated and passed through a bath of zinc in the presence of inert gas. The tube is then cooled, sized and cut. (See U.S. Pat. 3,122,114.)

Other prior proposed methods of coating a metal tube has included forming a tube from a previously coated strip of metal. During welding of the continuous seam the coating, which is usually zinc, is burned off with the result that the tube is now provided with a longitudinally extending uncoated and unprotected weld seam. Such a tube has then been passed, immediately after welding so that residual heat from the welding operation is present, through a chamber in which zinc is sprayed only along the exposed weld seam. Such spraying is performed while the metal of the tube remains between the melting point and the boiling point of the precoated zinc so that the spray coat will bond with the previous undisturbed coat. (See Pat. No. 2,927,371.)

Still other prior proposed methods of coating welded steel tubing have included cutting an uncoated, unclean tubing to selected lengths and then subjecting the pre-cut tubing to a cleaning operation to remove scale and foreign matter, heating the pre-cut tubes on racks or tube supports, and then spraying with a metal coating. This latter method is expensive and slow because of the cost of handling pre-cut bundles of tubing. With such handling it is difficult to obtain a continuous unbroken coating which is unmarred from handling marks.

There is a need for inexpensive metal tubing provided with a metallized, continuous, unbroken, attractive coating for many purposes. Such tubing may often be used in furniture, particularly outside or weather exposed lawn or patio furniture. Other uses of such a coated tube also occur in the automotive industry as for seat frames, side mirrors and steering columns, in marine applications where metal tubing is subjected to a salt environment, in underground applications where a chemically resistant coating is desirable to withstand electrolytic action; and various applications such as lawn, golf shopping carts, and like equipment. In such uses of metallized tubing it is apparent that the tubing is subjected to bending, forming, and shaping and the coating must withstand deformation of the tube without developing fractures or cracks, peeling, or separation from the tube surface. Thus it is highly desirable that a method and apparatus be provided for rapidly, inexpensively, and continuously coating a metal tube with a selected coating material such as zinc, aluminum, copper, brass and other types of metal finishes such that the coating is bonded to and adheres to the surface of the tubing and in effect becomes an integral part of the metal tubing.

The primary object of the present invention therefor is to disclose and provide a method and apparatus for coating metal tubing in a rapid and continuous manner while providing bonding of a coating to the tubing surface and providing an attractive finish.

An object of the invention is to uniformly coat a non-coated metal tube while it is advanced at rates of speed now common to the production of noncoated tubing.

Another object of the invention is to provide a means and method wherein the surface of a noncoated rapidly advancing tube is prepared to receive metallized spray just prior to a metallizing operation.

Another object is to disclose and provide a means and method for metallizing a continuously advancing formed noncoated tube wherein the tube is heated after sizing to present a heated surface, which is cleaned, to a metallizing operation whereby atomized metal spray may be uniformly deposited on the tube surface, and the coating becomes, in effect, integrally bonded and adhered thereto under selected conditions of heat required for such bonding.

A still further object of the invention is to disclose and provide a method of coating a continuously advancing metal tube wherein the metal coating is deposited on the tube without electrostatic deposition of the metal particles.

A still further object of the invention is to disclose and provide a method and apparatus for rapidly and economically providing different coating colors and finishes on a metal tube, such finishes including matte and polished finishes.

Generally speaking the present invention contemplates the combination in a continuous tube-forming means of a tube coating means and method which will rapidly, economically, inexpensively produce uniformly coated metal tube capable of withstanding corrosion and in some instances abrasion and other adverse chemical and physical conditions for increased and relatively long periods of time.

Other objects and advantages of the present invention will be readily apparent from the following description, in which the drawings exemplary illustrate an apparatus embodying the invention.

In the drawings:

FIG. 1 is a schematic diagram of a continuous tube forming and coating apparatus embodying the present invention.

FIG. 2 is a transverse section of view taken in the plane indicated by line II—II of FIG. 1 and illustrates an exemplary arrangement of shot blasting heads.

FIG. 3 is a transverse section of view taken in the plane indicated by line III—III of FIG. 1 illustrating an exemplary arrangement of spray nozzles.

Generally speaking, a tube-forming and coating means and apparatus embodying this invention and generally indicated at 10 may include a well known tube-forming process and apparatus generally indicated within the bracketed section shown as A.

In such tube-forming apparatus and process a supply coil of suitably selected strip steel 11 is carried by a rotatable reel from which the flat metal strip 14 may be drawn. Since such a flat strip is often fed to the tube-forming apparatus at rates in the order of and up to one hundred feet per minute, means are provided for welding transverse end edges of the strips of an exhausted coil and a new coil without decreasing the speed of the strip through the tube-forming machine. Such means may include a slack loop 15 of suitable controlled length and a welding device 16 between the coil reel and the slack loop, so that the welding operation may be rapidly performed while abutting end edges of the old strip and new strip may be joined.

The metal strip 14 is fed through a series of tube-forming rolls generally indicated at 17. Such tube-forming rolls progressively change the shape of the flat strip into a generally circular cross section, in which longitudinal side edges of the flat strip are brought into closely adjacent relation to form a longitudinally extending joints or seam. As the continuously advancing strip which is now been formed into a tube with a seam emerges from the tube-forming rolls, the opposed edges of the seam are welded by a well-known continuous seam welding device 18. Such a welding device may be a well-known continuous resistant welder. Immediately after the seam weld has been made by welding device 18, the upset weld metal which is formed on the outside of the tube may be removed by a suitable seam shaving tool 19 which may include a scarfing tool which smoothes the surface on the outer periphery of the seam. Immediately after leaving the scarfing tool, the tube may be passed through tube sizing rolls 20, which reduce the metal of the tube to a predetermined size and diameter and also serve to straighten the tube.

The above briefly described tube-forming apparatus and method is known. It may include, if desired, a cooling portion ahead of the tube-sizing rolls 20 in the event the temperature of the tube is at a temperature undesirable for proper sizing and straightening of the tube in the tube sizing rolls 20.

When the sized seam welded tube emerges from the tube-sizing rolls 20 it enters that portion of the apparatus and process identified in brackets by B, in which the tube is coated in accordance with the practice of this invention. The metal tube now identified as 24 may emerge from the tube-sizing rolls at a temperature of about 100° to 120° F. (if there has been some cooling) or at about 200° F. if there was no cooling provided in front of the tube-sizing rolls. The continuously advancing tube 24 then enters a heating means 25 which serves to heat the tube 24 to a temperature of about 750° F. Such a heater may occupy relatively little space in the tube machine line and may be an electric resistance heater, a propane or natural gas heater with oxygen. It is desirable to uniformly heat the tube throughout its circular or cylindrical cross section, and for this purpose a heating unit 25, if gas, may include gas burners disposed in a circle and arranged coaxially about the tube axis, so that the entire surface and the metal of the tube will be uniformly heated.

Tube 24, when it leaves sizing rolls 20 is relatively smooth surfaced and uncoated. The surface of tube 24 may be relatively dirty including oxidized scale, oil, and other foreign matter which may have been deposited on or placed in contact with the tube surface during the tube-forming process. Heating of tube 24 to 750° F. by heating unit 25 may burn off some of the foreign matter and tube 24 which emerges therefrom may be partially and further oxidized.

Tube 24 may then be advanced to shot blast means 26 which includes a plurality of nozzles 27 which forceably eject under air pressure small particles of shot against the tube surface. The shot particles may be of a selected hardened material and size as for example aluminum oxide particles passed by a 100 mesh screen. Means for mounting the nozzle heads 27 with their axes radial with respect to the axes of the tube and arranged circumaxially around the tube (FIG. 2) may include a mounting member 29 for each nozzle. Members 29 may be carried in a frame means 30 supported in suitable manner with respect to the path of tube 24. The nozzles 27 may be suitably adjusted to a selected distance from the surface of tube 24 by means of radially extending slots 28 in a nozzle mounting member 29. The shot blast means may include a housing or hood 31 in which tube 24 passes through a front curtain 32 into shot blast zone 33 and then through a back curtain 34. Shot blast zone 33 with said curtains and housing confines the sprayed aluminum oxide particles within the housing. Discharged particles may be collected in a bin at the bottom of the housing and then recirculated as by forced air back to nozzle heads 27. Above shot blast zone 33 the housing 31 may converge to a suitable duct which leads to a suitable dust collector.

During the shot blast operation the surface of tube 24 is cleaned; foreign particles and oxides or surface scale formed because of heating are removed. The tube surface is also roughened and abraded and is prepared for deposition of metallized particles thereon. Tube 24 entering shot blast zone 33 at a temperature at approximately 750° F. may leave the shot blast zone 33 at a temperature of about 650° F.

After leaving shot blast zone 33 the cleaned and roughened tube is advanced into metallizing zone 40, also including a housing 41 with a hood 42 leading to a dust collector. Metallizing zone 40 may be provided with one or more metallizing units 44 and preferably such metallizing units may be arranged in angularly spaced relation with nozzle heads 45 circumaxially positioned with respect to tube 24. In this example heads 45 are mounted in an annular frame 46, sets of nozzles in axially spaced frames 46 may be also angularly offset, that is one frame with respect to an adjacent frame 46 so that metallic spray particles are uniformly deposited on the surface of tube 24.

Each metallizing unit 44 may be of a type in which wire formed of the metal to be deposited is fed to the metallizing nozzle head 45 where it is heated and melted into metal particles or droplets and then sprayed under air pressure upon the surface of tube 24. Such metallizing units are well known and may employ air (preferably heated) under pressure of about 60 p.s.i. for transporting the metal particles or droplets to the tube surface. The surface of the tube in the metallizing zone 40 may be between about 500° to 600° F. and atomized particles may be sprayed at around 800° F. The metallized sprayed particles will be subjected to some cooling and possibly flattening as they impinge upon the shot blasted surface of the tube 24 and will form a strong mechanical interlock, bond and adherence to the clean surface of the tube. Since the tube and the metallized particles are at temperatures of between about 500° F. and 800° F. respectively, the metallized particles will flow together upon the tube surface and will form a continuous uniform homogeneous metallized coating bonded to the tube surface.

Nozzle heads 45 of each metallizing unit 44 may be provided with a selected spray pattern impinging upon the surface of the tube, the configuration of the spray pattern being dependent upon the number of nozzle heads in a unit, the speed of advancement of the tube, and the temperatures and pressures at which the metallized spray particles are impinged against the tube surface. The selected spray patterns are so configured as to provide direct impingement of the metallized particles on the surface of the tube, so that a uniform unbroken coating of sprayed particles is deposited thereon, and so that the deposited particles may flow a minimum distance in order to provide such a uniform and homogeneous metallized coating.

It will be understood that metal which may be used for such a metallized coating may include zinc, aluminum, copper, brass and other types of metal and stainless coatings composed of nickel, cadmium or mercury. In the event a stainless coating is desired, the temperatures of the tube and of the spray indicated above may be increased so as to achieve a desired bonding, adherence and continuity of the stainless coating on the surface of the metal tube. It will also be apparent that in metallizing zone 40 it may be desirable to apply one or more coats of different metal to the tube. For example, one set of metallizing units may spray zinc on the surface of the metal tube and a second set of units may spray aluminum on the deposited zinc coating.

The spray coated tube may be discharged from metallizing zone 40 at a temperautre of about 500° F., and is immediately advanced into and passed through a cooling zone 52 which may comprise a suitable spray head 53 for directing a cooling spray of water of synthetic water soluble oil at about 70° F. against the coated surface of the tube. The spray may be collected in trough and recirculated through a cooling means and then fed back to the spray head for spraying on the advancing tube 24.

The tube 24 may leave the cooling zone 52 at a temperature of about 200° F. and may then be passed through polishing or finishing rolls 56. Such rolls may be idle rolls and may be to impart a selected pressure on the coated surface to provide it with a smooth finished surface.

Immediately after passing through the finish rolls 56, the tube is advanced to a cut-off means 58, including a well known traveling shear. The tube is cut to preselected length. As the cooled coated tube is cut, cut lengths may roll transversely of the path of advancement of the continuous tube for collection in a suitable bin for wrapping in bundles of a selected number of tubes.

It will be apparent to those skilled in the art, that the method and apparatus of the present invention provides a continuous tube-forming process, which is adapted to be operated at speeds corresponding to the speed of operation of a tube-forming mill which does not coat metal tubing. Thus in the present invention, coated tubing is produced at essentially the same rates of production as uncoated tubing. The process is continuous, and the tube is properly sized, reheated, cleaned and prepared for a metallized coating, coated to a selected thickness of coating, cooled, finished and cut. The finish rolls may slightly cold work the surface of the coating, so as to not only polish the coating, but also make the surface of the coating more resistant to marring and abrasion.

It will be understood that for certain coated tube products it may be desirable to include another shot blast zone after metallizing zone 40 (in place of polishing rolls) in order to subject the coated tube to shot blast particles of selected size so as to produce a desired appearance and effect on the coating. Subjecting the coated tube to shot blast particles, which are extremely fine, will produce a polished tube of slightly different character and appearance than the polished tube provided by the finish rolls described above. Likewise, particles of different size and material may impart to the surface of the coated tube a matte finish.

It will be understood that various modifications and changes may be made in the method and apparatus described above, and that all such changes and modifications coming within the scope of the appended claims are embraced thereby.

I claim:

1. In a method of continuous forming and metallizing the exterior surface of tubing which has been formed from a strip of metal by passing the strip of metal through tube-forming rolls, welding a longitudinal continuous seam in the tube form, shaving the seam to present a smooth cylindrical surface, and passing the welded tube through tube-sizing rolls comprising, the additional steps, while continuously advancing the sized tube, of:

heating the sized tube to a selected temperature;
subjecting the heated tube to shot blast to clean and prepare the surface of the tube;
spraying a selected metal in the form of metal particles on the surface of the heated shot-blasted tube while the tube remains at a temperature for enhancing bonding and adhering of sprayed metal particles to the metal of the tube;
cooling the coated tube as it is continuously advanced;
and then cutting the cooled, coated tube to selected lengths.

2. In a method as stated in claim 1 including the step of:

polishing the coated tube before cutting the tube to length.

3. In a method as stated in claim 1 including the step of:

shot blasting the coated tube before cutting the tube to length.

4. In a method as stated in claim 1 wherein the sized tube is heated to about 750°, shot blasted at temperatures between 600° and 750°, and is sprayed with metal particles while the advancing tube is between temperatures of about 500° and 600° F.

5. In a method of coating a tube, including the steps of:

continuously advancing a preformed, presized continuous tube having an uninterrupted uncoated tube surface along a straight path;
heating the advancing tube to a selected temperature;
peripherally cleaning the uncoated surface of the advancing heated tube with minimum loss of temperature;
peripherally spraying finely divided particles of a coating material on said tube surface of the advancing tube while the heated tube is within a selected temperature range;
and cutting the advancing coated tube to length.

6. In a method of coating a tube as stated in claim 5 including the step of heating the coating material for enhancing the bonding of deposited heated spray particles on the heated tube surface.

References Cited

UNITED STATES PATENTS

| | | | |
|---|---|---|---|
| 2,927,371 | 3/1960 | Hays | 29—429 |
| 3,122,114 | 2/1964 | Kringel et al. | |
| 3,417,453 | 12/1968 | Clarke | 29—460 |

THOMAS H. EAGER, Primary Examiner

U.S. Cl. X.R.

29—200, 460